United States Patent [19]

Cham et al.

[11] 4,249,170

[45] Feb. 3, 1981

[54] ANNUNCIATOR

[75] Inventors: Edward J. Cham, Howland Township, Trumbull County; Ronald M. Stefanick, Hubbard, both of Ohio

[73] Assignee: Westinghouse Electric Corp., Pittsburgh, Pa.

[21] Appl. No.: 82,831

[22] Filed: Oct. 9, 1979

[51] Int. Cl.³ .................... G08B 21/00; H01H 47/00
[52] U.S. Cl. .................... 340/646; 340/506; 340/514; 340/644; 324/51; 361/37; 361/210
[58] Field of Search .............. 340/646, 500, 506, 512, 340/514, 517, 520–523, 524, 525, 536; 361/210, 37, 38; 324/51

[56] References Cited

U.S. PATENT DOCUMENTS

| | | | |
|---|---|---|---|
| 2,525,499 | 10/1950 | Peterson et al. | 361/37 |
| 3,234,541 | 2/1966 | Paull | 340/517 |
| 3,449,633 | 6/1969 | Fischer et al. | 361/37 |
| 3,480,938 | 11/1969 | Martin | 340/514 |
| 3,512,147 | 5/1970 | Martin | 340/514 |
| 3,540,043 | 11/1970 | Crosthwait | 340/514 |
| 3,550,121 | 12/1970 | Porter | 340/520 |
| 3,644,926 | 2/1972 | Wildgruber | 361/210 |
| 3,729,734 | 4/1973 | Kipling | 340/506 |
| 3,821,605 | 6/1974 | Pendrak | 361/37 |
| 3,846,698 | 11/1974 | Lawton | 340/646 |

OTHER PUBLICATIONS

"Edwards Annunciator", Westinghouse Electric Corporation, Sep. 1977, pp. 1–4.

Primary Examiner—Donald J. Yusko
Assistant Examiner—Donnie L. Crosland
Attorney, Agent, or Firm—J. P. Hillman

[57] ABSTRACT

A power transformer having a magnetic core winding assembly disposed within a casing, which contains multiple sensing means to sense abnormalities in fault conditions of the transformer, and an annunciator, having electro-mechanical relay circuits responsive to the sensing means for energizing an alarm circuit. The electromechanical relay circuits are arranged to provide two or more alarm point indication circuits, a pulse circuit and a bistable switching circuit adapted to energize external protective apparatus. The pulse circuit translates one or more sensing means signals of undetermined duration to a single "pulse" signal of predetermined duration. This pulse signal is used to control a switching circuit with a contact connected to operate external protective devices such as an audible alarm. The pulse circuit provides for isolation of the indication circuits from the switching circuit such that each may be reset independently of one another. This provides the annunciator with the capability of silencing an audible alarm without interfering with the ability of the annunciator to respond to another abnormal condition by energizing the audible alarm circuit. The electromechanical relay annunciator is capable of operating with the high voltages and vibrations encountered in the operation of power transformers.

8 Claims, 3 Drawing Figures

ANNUNCIATOR

BACKGROUND OF THE INVENTION

1. Field of the Invention

The invention relates in general to electrical inductive apparatus and in particular to an annunciator for multiple protective and/or monitoring devices for such apparatus.

2. Description of the Prior Art

When a transformer or other electrical apparatus is subjected to an internal fault or mechanical failure, one or more protective devices respond by sending a signal from the internal sensing means to a central point. The function of the annunciator is to monitor a multiple of fault indications at the central point, at which point the annunciator "alarms" an abnormal condition, usually by audio means such as an alarm or siren. The annunciator also distinguishes the abnormal condition, usually by visual means such as a lamp or mechanical target.

While the malfunction is being repaired, it is normal practice for an operator to silence the audio alarm, usually by opening a set of contacts in the alarm circuit. This practice is dangerous, as a subsequent malfunction will not be detectable by audio means. Also, the alarm silencing procedure requires the operator to reset the alarm circuit after the malfunction has been repaired. If the operator should forget to reset the alarm circuit, there would again be no audible signal to alert the operator of a subsequent fault or abnormal condition.

An annunciator which has the capability of silencing the alarm without defeating the ability of the annunciator circuit to alarm a subsequent fault condition is usually found in an annunciator employing solid-state circuitry. However, annunciators utilizing solid-state components have characteristics that are not suitable for the environment of electrical power apparatus, particularly the temperatures and transients that power and distribution transformers are subjected to. Another problem with solid-state devices is that when failure does occur due to an over-voltage or current transient, the device usually must be replaced, as it is not susceptible to on-site repair. A still further problem with annunciators employing solid-state circuitry is that the device cannot withstand standard tests that are applied to transformers as part of the assembly process. Power transformer auxiliary control wiring is normally tested for insulation integrity by applying approximately 1500 volts for one minute between components and ground. Solid-state devices as supplied in annunciators rarely permit application of test voltages above 600 volts. During the insulation tests the transformer annunciators utilizing solid-state components must be disconnected and either tested separately at a lower voltage or not tested at all.

Circuits employing electro-mechanical relay components would be suitable for the type of electrical power apparatus under discussion. One such annunciator employs a series of relays with "passing contacts" which are dependent upon gravity for their operation, to satisfy the alarm reset condition. However, the relay components are susceptible to malfunction due to the normal vibrations of a transformer during its operation. Care must also be taken with this particular annunciator in the mounting of it on the transformer tank wall or other desired mounting areas such that all of the passing contacts are in a position to utilize the pull of gravity for their operation. Another liability of this type of annunciator is that the multiple indication circuits feed directly to the alarm relay circuit. During simultaneous operation of several protective devices, an alarm signal may be lost due to undercapacity of the alarm circuit to handle multiple alarm signals.

It would be desirable to have an annunciator that utilizes standard electro-mechanical relay components and provides the capability of resetting the alarm without defeating the ability to respond to a subsequent malfunction. In addition it would be desirable for the annunciator to respond to simultaneous signals from multiple protective devices without losing any individual signal.

SUMMARY OF THE INVENTION

In accordance with the present invention, an electrical transformer is provided with annunciating means utilizing electro-mechanical relays for responding to alarm signals of undetermined duration by generating a pulse signal of predetermined duration. The alarm signals are provided by multiple sensing means disposed wthin said transformer to monitor predetermined operating parameters of the transformer. When the transformer is subjected to an internal fault or other malfunction, one or more of the sensing means responds to the abnormality by providing an alarm signal. The annunciator brings the multiple alarm signals to a central point where an arrangement of electro-mechanical relays provides a pulse signal of predetermined duration and feeds the pulse signal to bistable switching means having first and second positions. The bistable switching means switches to its first position in response to the pulse signal and switches to its second position in response to a signal from a suitable reset means such as a pushbutton located on the annunciator. The switching of the bistable switching means opens and closes at least one contact adapted for connection to external protective apparatus such as an audible alarm.

The arrangement of electro-mechanical relays includes a normally open contact connected in series with and operated by the solenoid coil of each relay so as to seal in the relay after it has operated. The annunciator circuit includes indicating means corresponding to each sensing means. Testing means and reset means are also included.

BRIEF DESCRIPTION OF THE DRAWINGS

The invention may be understood, and further advantages and uses thereof more readily apparent, when considered in view of the following detailed description of exemplary embodiments, taken with the accompanying drawings in which.

DESCRIPTION OF THE PREFERRED EMBODIMENT

When an abnormality exists in a transformer or other electrical apparatus, the annunciator should:

1. Sound an audio alarm.

2. Provide a visual indication to distinguish which specific alarm point had functioned. The visual indication should remain until manually reset by the operator even after the abnormality has ceased.

3. Have an alarm reset circuit that does not interfere with the alarming of a subsequent malfunction or abnormality.

In addition, the annunciator must meet the high voltage requirements of electrical power apparatus and be immune to normal vibrations encountered on power and transmission transformers.

Figure 1:
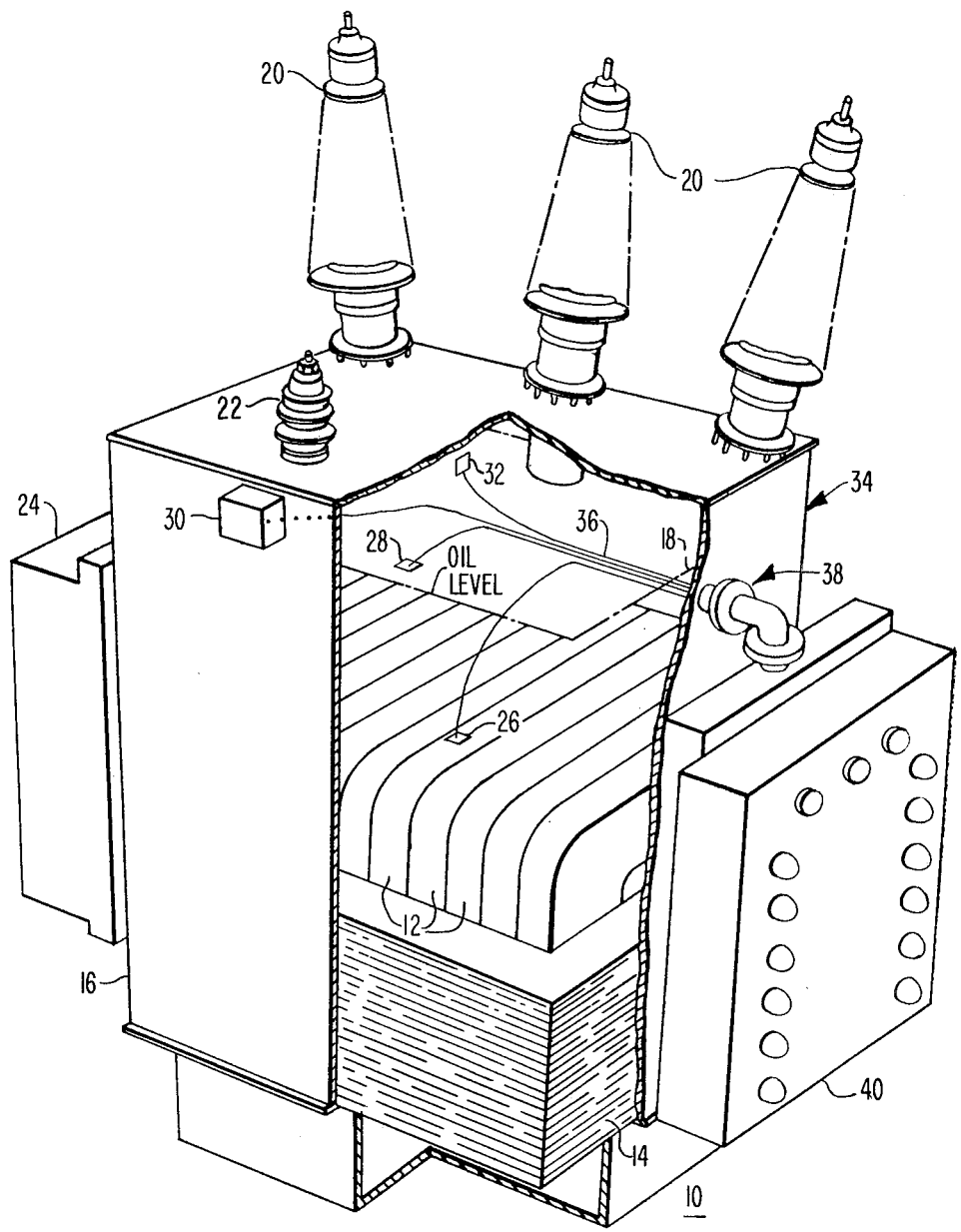
FIG. 1 is a pictorial view of a transformer, partially cut away, illustrating an embodiment of the invention.

Referring now to the drawings, and FIG. 1 in particular, there is shown a pictorial view of a transformer 10 constructed according to the teachings of the invention. More specifically, transformer 10 includes a plurality of electrical coils 12 connected to provide high and low voltage windings, with the coils being disposed in inductive relation with a magnetic core 14. The magnetic core-winding assembly is disposed within a casing or tank 16 which is shown partially cut away, with the tank 16 being filled to a predetermined level 18 with an insulating and cooling liquid dielectric such as oil. The tank 16 includes high and low voltage bushings 20 and 22, respectively, for connecting the windings with an external electrical system and electrical load, and heat exchanger means 24 for cooling the liquid dielectric. Transformer 10 includes a number of protective devices for monitoring operating parameters, such as winding temperature indicating means 26, liquid dielectric temperature indicating means 28, pressure sensor means 30 and inert air density level detector means 32. Additional protective devices (not shown) such as liquid dielectric level sensing means, mechanical relief device sensing means, auxiliary power supply sensing means, fan overload sensing means, and pump operation sensing means, among others, may be included to monitor additional operating parameters of transformer 10, if desired. Each of the protective devices is capable of sending an alarm indication out through the transformer tank wall 34 by means of wiring harness 36 passing through conduit 38 to annunciator 40 which is shown attached to tank 16, but may be located remote from transformer 10. The protective devices include sensor means for detecting a fault or abnormal condition and signal means which is responsive to the sensor means for sending an alarm indication to the annunciator 40. The signal means is most generally the mechanical closing of a set of contacts or an output voltage which operates a relay to close a set of contacts.

The circuits of annunciator 40 utilize solenoid operated, mechanical relays connected to provide circuits which initiate the operation of protective apparatus as well as provide continuous indication of the alarm point until manually reset by the operator. Electro-mechanical relays in this application have certain advantages, most importantly of which are the ability to withstand the operating temperatures of the transformer 10 and the ability to eliminate nuisance tripping due to normal operational shocks and vibrations of the transformer.

Figure 2:
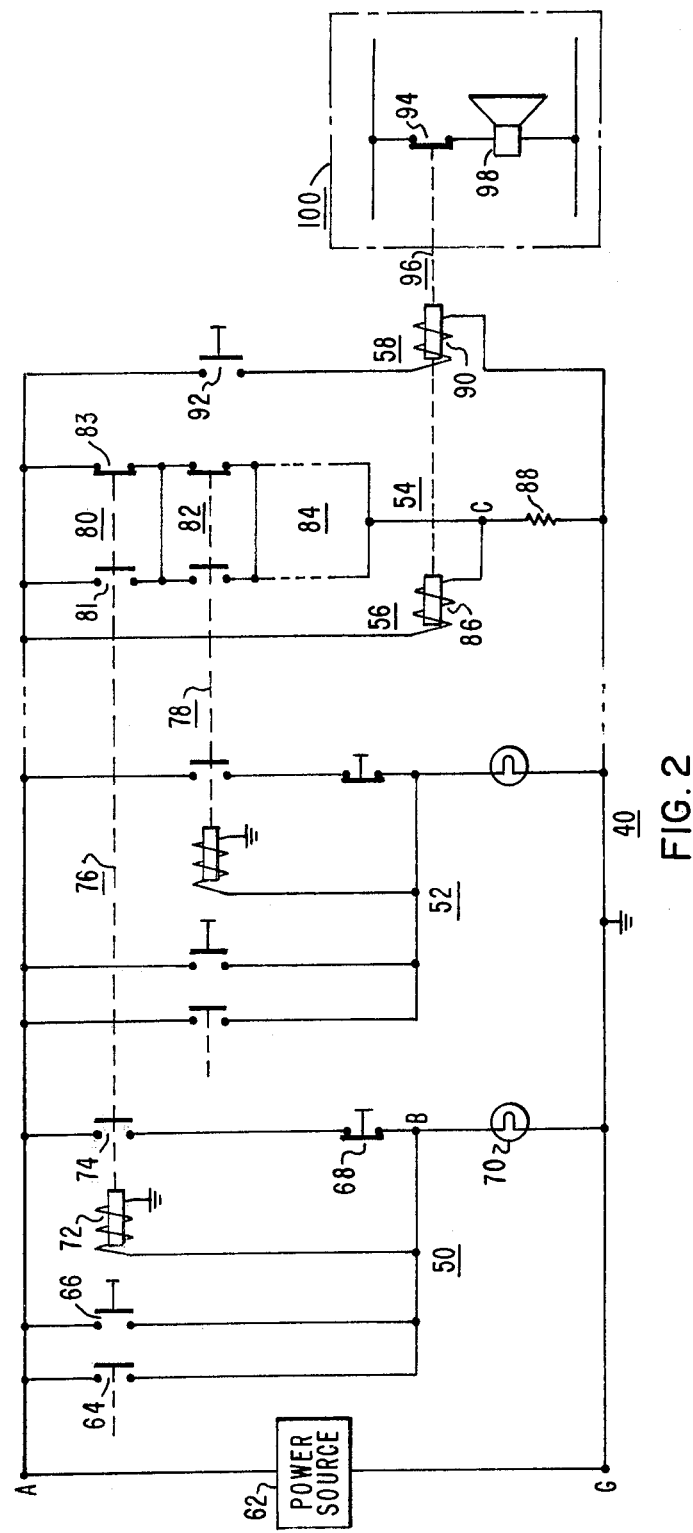
FIG. 2 is a schematic diagram of the conventional relay component annunciator shown in FIG. 1 constructed according to the teachings of the invention.

Referring now to FIG. 2, there is shown a schematic diagram of annunciator 40. Annunciator 40 has all circuits, i.e. all alarm point indication circuits such as circuits 50 and 52 and latched relay circuit 54, connected between conductor or junction A and conductor or junction G. Conductor A is designated positive plurality and conductor G is designated ground, both conductors being energized by a power source shown generally at 62 which may be an AC or DC power supply compatible with the relays selected for use in the annunciator. In the preferred embodiment, relays with solenoids compatible with a DC power source were selected so that a DC battery could be employed as the power source. Substations employ a DC battery to trip and close circuit breakers. It is common practice to use this existing battery for the power supply so that the annunciator will operate during a power failure. However, the invention is not limited to such a power supply but may be used with various alternative power supplies depending on the component relays selected.

More specifically, alarm point indication circuit 50 includes sensing means contact 64, testing means 66, reset means 68, indicating means 70, electro-mechanical relay solenoid 72, normally open contact 74 and junction B, all interconnected between junctions A and G. Junction B is the designation given to the common connection of the circuit elements 64, 66, 68, 70 and 72. Branch AB includes sensing means contact 64, testing means 66, and the serially connected normally open contact 74 and reset means 68, all connected in parallel. Branch BG includes indicating light 70 and electro-mechanical relay solenoid 72 connected in parallel.

Sensing means contact 64 corresponds to the mechanically operated contacts of one of the protective devices 26, 28, 30 or 32 shown in FIG. 1, or the contacts of an intermediate relay (not shown) responsive to one of the protective devices. Testing means 66 may be a momentary contact device such as a normally open manually operated pushbutton. Reset means 68 may be a momentary interruption device such as a normally closed manually operated pushbutton. Indicating means 70 may be an indicating lamp. Normally open contact 74 may be a set of normally open contacts mechanically attached to electro-mechanical relay 76 of which solenoid 72 is the electro-mechanical operator.

As shown in FIG. 2, alarm point indication circuit 52 includes electro-mechanical relay 78 and other circuit elements which are similar to, and interconnected in the same manner as described above for alarm point indication circuit 50. Additional alarm point indication circuits, corresponding to additional protective devices interposed on transformer 10 of FIG. 1, as many as desired, may be interconnected between conductors A and G. The dotted portions of conductors A and G in FIG. 2 indicate where the additional alarm point indication circuits would be connected on the annunciator 40.

Latched relay circuit 54 includes unlatching circuit 56 and relatching circuit 58. Unlatching circuit 56 includes unlatching solenoid 86 and pulse circuit 84. Pulse circuit 84 includes junction C, resistor 88, and a plurality of contact circuits, such as contact circuits 80 and 82. Each contact circuit corresponds to a respective alarm point indication circuit and consists of a normally open contact, such as contact 81, connected in parallel with a normally closed contact, such as contact 83, both contacts being mechanically linked to and operated by the electro-mechanical relay, such as relay 76, of their respective alarm point indication circuit, such as alarm point indication circuit 50. Similarly, the parallel connected normally open and normally closed contacts of contact circuit 82 would be mechanically attached to and operated by the electro-mechanical relay, such as relay 78, of another alarm point indication circuit, such as alarm point indication circuit 52. Each alarm point indication circuit therefore has an associated contact circuit. All of the contact circuits and resistor 88 are connected in series, forming pulse circuit 84. The dotted portions of pulse circuit 84 indicate in FIG. 2 where additional contact circuits would be located, if additional alarm point indication circuits were included in annunciator 40. Pulse circuit 84 is connected between conductors A and G. Unlatching solenoid 86 is connected between A and C. Relatching circuit 58 includes latching solenoid 90 serially connected with reset means 92 between conductors A and G.

Unlatching solenoid 86 and latching solenoid 90 are the electro-mechanical operators of, and together with its associated alarm contact 94, comprise latched relay 96. Alarm contact 94 is normally closed when latched relay 96 is in the unlatched position. Alarm contact 94 is adapted for connection to external protective apparatus, such as an audible alarm or circuit breaker, and as such is shown in FIG. 2 in an external alarm circuit 100 serially connected with protective apparatus 98, which in this case is an audible horn, but may be any desired alarming device or protective circuit. Latched relay 96 of course may and ususally does have additional normally open and normally closed contacts (not shown) adapted for connection to additional external protective apparatus.

Commercially available latched relays typically designate their dual solenoids as the operate coil and the reset coil. The operate coil is generally a heavier, slower responding solenoid because it must overcome a larger opposing force. The reset coil is generally a lighter, faster responding solenoid because it has a much smaller opposing force to overcome. In the preferred embodiments, the reset coil has been used successfully for the unlatching solenoid such as unlatching solenoid 86. A fast responding solenoid is necessary to operate in response to the short duration "pulse" signal from pulse circuit 84 as explained below. This is the reason that a normally closed contact of latched relay 96 is chosen for alarm contact 94. During normal operation, normally closed contact 94 will be open because latched relay 96 will be in the latched or operate position.

In operation a protective device such as pressure sensing means 30, either directly or through a relay, closes normally open contact 64 thereby energizing the solenoid 72 of electro-mechanical relay 76 and alarm point indicating light 70. When solenoid 72 is energized, normally open contact 74 closes thereby sealing in the parallel circuit containing solenoid 72 of electromachanical relay 76 and indicating light 70. Since the electro-mechanical relay 76 is now energized through its own contact 74, the alarm point indication circuit 50 will remain energized after the fault condition no longer exists and the normally open contact 64 reopens. Alarm point indication circuit 50 will remain energized until manually reset by the operator by means of reset means 68 opening the circuit ABG thereby deenergizing relay 76. Alarm point indication circuit 50 will then be ready for another alarm signal from normally open contact 64. Testing means 66 may be used to energize relay 76 and indicating light 70; thereby sealing in relay 76 through contact 74 as just described. Testing means 66 then can be used to test the integrity of alarm point indication circuit 50.

Alarm point indication circuit 52 will operate in a similar manner in response to a signal from another protective device, such as liquid temperature indication means 28. Alarm point indication circuit 52 will also function in a similar manner in response to the manually-operated test and reset circuits just described for alarm point indication circuit 50.

With the energizing of the electromechanical relay coil in each alarm point indication circuit, the associated relay contact points operate. When any individual electromechanical relay coil is energized, all contact points mechanically linked with that coil are operated, the normally open contact points close and the normally closed contact points open. In annunciator circuit 40 each electromechanical relay such as relay such as relay 76 has three sets of relay contact points associated with it such as contacts 74, 81, and 83, as indicated by the dotted lines in FIG. 2. One set, such as contact 74, is used to seal in the alarm point indication circuit as described above. The other two sets of contact points, such as 81 and 83 are used in the associated contact circuit, such as contact circuit 80 which along with the contact circuits associated with the other alarm point indication circuits, form pulse circuit 84. The remaining component of pulse circuit 84, resistor 88 is selected to limit the current below the maximum rating of the contact points but sufficient to energize the unlatching solenoid 86 as explained below. When relay 76 is energized, normally open contact 81 and normally closed contact 83 operate, i.e., is normally closed contact 83 opens and normally open contact 81 closes. There is a predetermined length of time when the normally open contact, such as contact 81, has not yet closed and the normally closed contact, such as contact 83, has already opened. It is during this interim when both contacts of an individual contact circuit are open simultaneously that the low impedance circuit between junctions A and C becomes an open circuit and a "pulse" of current will flow through a higher impedance path between junctions A and C, that is through unlatching solenoid 86.

The unlatching solenoid 86 is "shunted" or short-circuited by the series of contact circuits such as contact circuits 80 and 82, each containing a normally closed contact. After one of the alarm point indication circuits responds to an alarm signal by energizing its associated relay, the unlatching solenoid of the latched relay is again "shunted" or short-circuited by the pulse circuit 84. Since both contacts of the respective contact circuit have operated, now the normally open contact is closed, completing the short circuit through the pulse circuit. It is only during the interim when for a fraction of a second both contacts of an individual contact circuit are open that a "pulse" of current energizes the unlatching solenoid 86 and causes the latching relay 96 to "unlatch." It is because of this unique "pulse" of current for operation of the unlatching solenoid, that the latched relay can be reset (latched) and be immediately ready for a new "pulse" signal from the pulse circuit. This allows resetting without de-energizing the alarm circuit, or the applicable alarm point indication circuit, so that the alarm circuit and the annunciator are immediately ready to "announce" or alarm a subsequent alarm signal from the same or another protective device within the transformer.

Alarm contact 94 will close upon the latched relay 96 being unlatched in response to a signal from the pulse circuit and will remain closed until the latched relay has been put back into the latched state. Alarm contact 94 as well as additional normally open and normally closed latched relay contacts (not shown) may be connected to operate alarm circuits, circuit breakers and other external protective devices which perform desired functions. The alarm devices will be energized continuously due to the fact that the latched relay 96 is now in the unlatched state and will remain in the unlatched state even if the abnormality of fault condition within the transformer ceases and the sensing means no longer provides an alarm signal.

Alarm circuit 100 will be de-energized or silenced by energizing relatching circuit 58. Relatching circuit 58 is energized by operating reset means 92, whereupon latching solenoid 90 is energized returning latched relay 96 to the latched position. When latched relay 96 returns to the latched position, alarm contact 94 opens, thereby deenergizing alarm circuit 100 and any protective device connected thereto.

In summary, latched relay circuit 54 includes a latched relay 96 having dual operators, an unlatching solenoid 86 and a latching solenoid 90. The unlatching solenoid responds to a signal from the pulse circuit 84 by "unlatching" or switching to a first stable operating position, and responds to a signal from reset means 92 by "latching" or switching to a second stable operating position. Latched relay 96 then functions in latched relay circuit 54 as a bistable switching means having first and second stable positions, switching to its first position in response to a signal from the pulse circuit and switching to its second position in response to a signal from reset means 92. This provides for complete independent operation of the individual alarm point indication circuits and the external alarm circuit.

Figure 3:
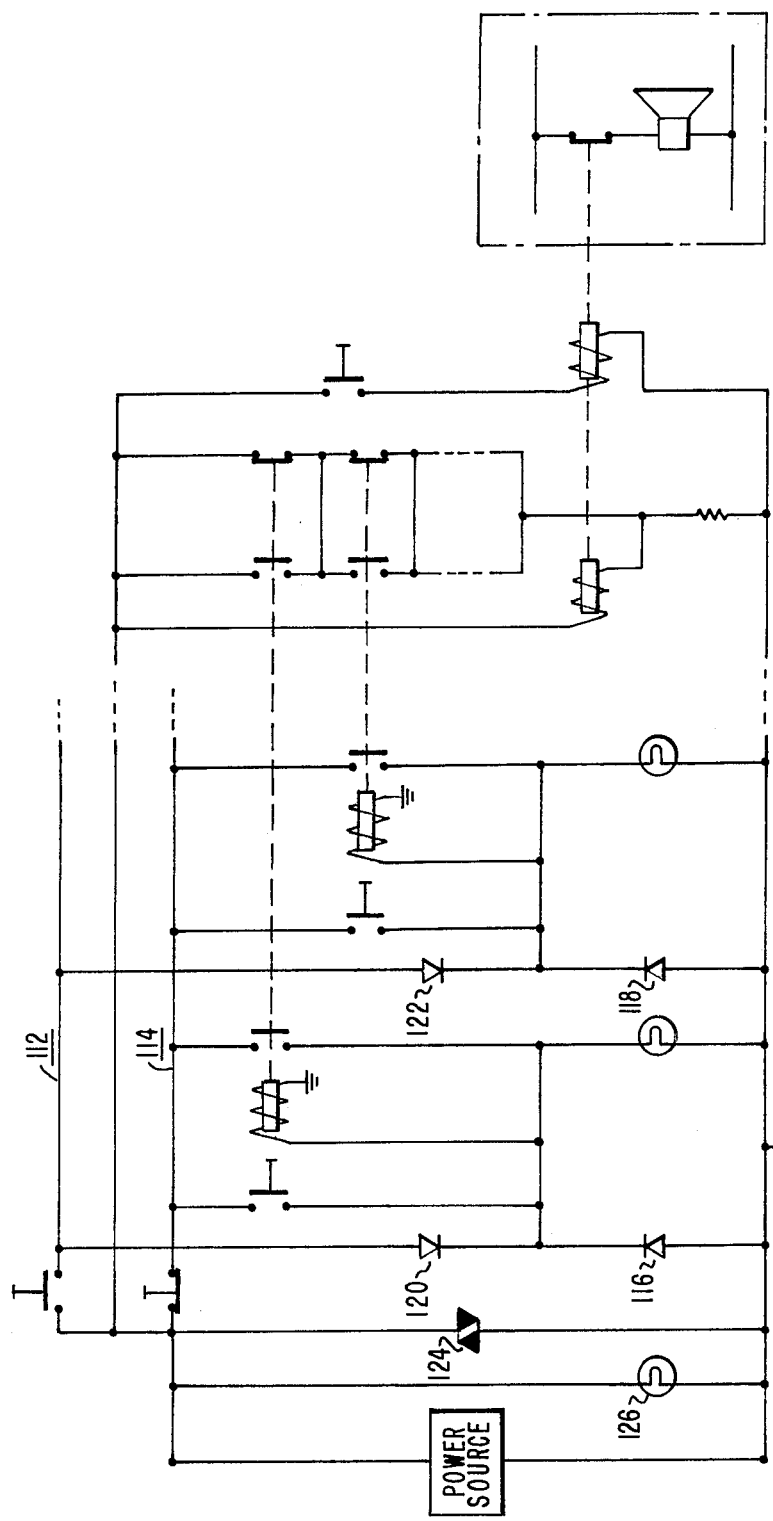
FIG. 3 is a schematic diagram of another embodiment of the invention which may be used for the annunciator of FIG. 1.

Referring now to FIG. 3, there is shown a schematic diagram of an annunciator 110 constructed according to another embodiment of the invention. Annunciator 110 is very similar in circuitry and operation to annunciator 40 previously described, the main differences being a common testing circuit 112 and a common reset circuit 114 for all of the alarm point indication circuits. Annunciator 110 also includes rectifier diodes such as diodes 116 and 118 in each alarm point indication circuit to limit the "inductive kick" from the relay solenoids and thereby reduce contact point deterioration. Rectifier diodes such as diodes 120 and 122 are included in the common test circuit 112 to prevent the test circuit 112 from energizing all the alarm point indication circuits wherever an individual alarm point indication circuit becomes energized in response to the closing of an individual sensing means contact. Varistor 124 is included as a protective device to act as a shunt for voltage and current transients. Indicating light 126 is added to provide confirmation that power is being supplied to the annunciator.

In conclusion, there has been disclosed herein an annunciator that combines the operating characteristics of solid-state devices (ability to reset the alarm without interfering with subsequent alarming of another abnormality) with the operating margins necessary for power transformers (including ability to withstand a 1500 volt insulation integrity test). The annunciator disclosed is manufactured of readily available electro-mechanical relays, which relays without modification are suitable for the operating temperatures of power transformers, as well as the normal vibrations of operating power transformers.

The alarm point indication circuits are not connected directly to the latched relay circuit. The alarm point indication circuits are both isolated from and coupled to the latched relay circuit by means of the intermediate pulse circuit. The ability to reset either the alarm point indication circuits or the latched relay circuit independently of one another stems from the arrangement wherein the pulse circuit isolates the alarm point circuits from the latched relay circuit. Concurrently the latched relay circuit is operated by the alarm point indication circuits due to the same arrangement wherein the pulse circuit couples the alarm point indication circuits to the latched relay circuit. This results in at least three distinct advantages for the annunciator disclosed herein:

(1) The annunciator has the ability to reset the alarm without interfering with the ability to alarm a subsequent abnormality;

(2) The annunciator will not lose a signal due to simultaneous operation of multiple sensing devices, a fault of electro-mechanical relay annunciators of the prior art where the indication circuits were connected directly to the alarm circuit;

(3) It is not necessary to provide a manual override to interrupt power to the alarm and/or external protective apparatus circuits. The alarm is silenced by resetting (i.e. latching) the latched relay. Thereafter the annunciator is immediately ready to alarm a subsequent fault or other malfunction.

Since the undetermined duration alarm signal from the alarm point indication circuits is translated into a pulse signal of predetermined duration, the bistable switching means (i.e. the latched relay) can respond to a reset signal immediately after responding to a pulse signal and vice versa. The annunciator has two stable operating conditions and the ability to immediately switch to either condition. The first stable operating condition is the "normal" condition triggered into this condition by the relatching circuit reset means. The second operating condition is the "alarm" condition, triggered into this condition by an alarm signal from one of the sensing means.

We claim:

1. An electrical transformer comprising:

a magnetic core;

electrical windings disposed in inductive relation with said magnetic core;

at least first and second sensing means responsive to first and second predetermined operating parameters of said transformer respectively, said first and second sensing means providing an alarm signal when its associated operating parameter deviates from a predetermined range of operation;

annunciating means including at least first and second electro-mechanical relays, each of said relays having at least one normally open and one normally closed contact, respectively, arranged such that the normally closed contact breaks before the normally open contact makes when the relay is operated, said normally open and normally closed contacts of each of said first and second relays being connected electrically in parallel forming first and second contact circuits, respectively;

means connecting said first and second contact circuits in series to form a pulse circuit;

said first and second sensing means being connected to operate said first and second electro-mechanical relays, respectively, when said respective sensing means provides an alarm signal, with the arrangement whereby said respective contact circuit's normally closed contact breaks before the normally open contact makes, causes said pulse circuit to provide a first signal of predetermined duration;

first reset means for providing a second signal when said first reset means is activated; and bistable switching means having first and second positions and at least one contact adapted for connection to external protective apparatus, said bistable switching means being responsive to said pulse circuit and said first reset means, switching to its first position in response to said first signal, and switching to its second position in response to said second signal, the switching of said bistable switching means opening and closing said at least one contact.

2. The electrical transformer of claim 1 wherein the bistable switching means includes a latched relay having a larger, slower responding operate solenoid and a smaller, faster responding reset solenoid, said reset solenoid being connected to the pulse circuit to respond to the shorter duration first signal, and said operate solenoid being connected to the first reset means to respond to the longer duration second signal.

3. The electrical transformer of claim 1 wherein the annunciator includes at least one testing means, said testing means providing an alarm signal when said testing means is activated, said testing means being connected to operate at least one of the electro-mechanical relays when said testing means provides an alarm signal.

4. The electrical transformer of claim 1 wherein the annunciator includes first and second means for maintaining energization of the respective first and second relays after the relay has operated.

5. The electrical transformer of claim 1 wherein the annunciator includes at least one additional reset means, said additional reset means interrupting the current flow in a predetermined circuit when said additional reset means is activated, said additional reset means being connected to deenergize at least one of the electro-mechanical relays when said additional reset means is activated.

6. The electrical transformer of claim 1 wherein the annunciator includes at least first and second indicating means, each of said indicating means providing a visible indication when energized, said first and second indicating means being connected in parallel with the solenoid coil of the first and second relays respectively, thereby providing a visual indication when the respective sensing means provides an alarm signal.

7. The electrical transformer of claim 4 wherein said first and second relays have first and second additional normally open contacts and first and second solenoids respectively; and wherein the means for maintaining energization of the first and second relays after the relay has operated includes electrically connecting said first and second additional normally open contact in series with said first and second solenoids respectively.

8. The electrical transformer of claim 1 wherein the pulse circuit is connected between the bistable switching means and the first and second relays to enable independent operation of each of the first and second relays and the bistable switching means.

* * * * *